US012498172B2

(12) United States Patent
Mack et al.

(10) Patent No.: US 12,498,172 B2
(45) Date of Patent: Dec. 16, 2025

(54) RADIOFREQUENCY HEATING OF WOOD USING A THREE-ELECTRODE SYSTEM HAVING A WINGED CENTRAL ELECTRODE

(71) Applicant: The United States of America, as Represented by the Secretary of Agriculture, Washington, DC (US)

(72) Inventors: Ronald Mack, Buzzard Bay, MA (US); Mark Hamelin, Midland, CA (US); John J. Janowiak, Julian, PA (US); Karolina Szymona, University Park, PA (US); Kelli Hoover, Pennsylvania Furnace, PA (US)

( * ) Notice: Subject to any disclaimer, the term of this patent is extended or adjusted under 35 U.S.C. 154(b) by 564 days.

(21) Appl. No.: 18/081,039

(22) Filed: Dec. 14, 2022

(65) Prior Publication Data

US 2023/0194165 A1    Jun. 22, 2023

Related U.S. Application Data

(60) Provisional application No. 63/292,050, filed on Dec. 21, 2021.

(51) Int. Cl.
  *F26B 5/04*   (2006.01)
  *H05B 6/50*   (2006.01)
  *H05B 6/54*   (2006.01)

(52) U.S. Cl.
  CPC ............... *F26B 5/048* (2013.01); *H05B 6/50* (2013.01); *H05B 6/54* (2013.01); *F26B 2210/16* (2013.01); *H05B 2206/046* (2013.01)

(58) Field of Classification Search
  CPC ...... F26B 5/048; F26B 3/347; F26B 2210/14; F26B 2210/16; B27K 5/0055;
  (Continued)

(56) References Cited

U.S. PATENT DOCUMENTS

| 2,307,344 A | 1/1943 | Zottu |
| 2,483,569 A | 10/1949 | Baker |

(Continued)

FOREIGN PATENT DOCUMENTS

| DE | 815819 C | 10/1951 |
| GB | 576097 A | 3/1946 |

(Continued)

OTHER PUBLICATIONS

The extended European Search Report issued on May 10, 2023 for EP Application No. 22214729.0-1202; pp. 1-42.

(Continued)

*Primary Examiner* — Steven B Mcallister
*Assistant Examiner* — Xiaoting Hu (57) ABSTRACT

Wood kilns, electrode systems for wood kilns, and methods of using the systems for the radiofrequency (RF) drying and phytosanitizing of wood are provided. The electrode systems are based on a three-electrode design in which a central plate electrode having winged edges is disposed between a pair of ground plate electrodes. The winged edges of the central electrode improve the uniformity of heating during the phytosanitizing process, relative to a five-electrode parallel plate system, or a three-electrode parallel plate system having a conventional planar central plate electrode.

14 Claims, 5 Drawing Sheets
(5 of 5 Drawing Sheet(s) Filed in Color)

(58) Field of Classification Search
CPC .... B27K 5/0075; B27K 2240/20; H05B 6/50; H05B 6/62; H05B 2206/046
See application file for complete search history.

(56) References Cited

U.S. PATENT DOCUMENTS

| | | | | |
|---|---|---|---|---|
| 2,532,460 | A * | 12/1950 | Phillips, Jr. | D01D 10/06 34/256 |
| 2,575,604 | A | 11/1951 | Thompson | |
| 6,225,612 | B1 * | 5/2001 | Enegren | F26B 3/347 219/774 |
| 10,898,599 | B2 | 1/2021 | Janowiak et al. | |
| 2018/0177904 | A1 * | 6/2018 | Janowiak | B27K 5/0055 |

FOREIGN PATENT DOCUMENTS

| | | | | |
|---|---|---|---|---|
| KR | 101961607 | B1 * | 3/2019 | B27K 3/0214 |
| WO | WO 00/50207 | | 8/2000 | |
| WO | WO-0050207 | A2 * | 8/2000 | F26B 7/00 |

OTHER PUBLICATIONS

"Radio Frequency Vacuum Kiln Dried Live Edge Slabs," Live Edge Table Blog Posted on Jun. 10, 2019; pp. 1-7. https://livingedgetable.com/radio-frequency-vacuum-kiln-dried-live-edge-slabs/.

Ciprian Lazarescu, et al., "Heating characteristics of western hemlock (Tsuga heterophylla) in a high frequency field," *Eur. J. Wood Prod.* (2012) 70:489-496. DOI 10.1007/s00107-011-0579-2.

Carlos Salinas, et al., "Modelling of Radio-frequency Heating of Piles of Pinus radiata Wood," *BioResources* (2018), 13(1); pp. 945-953.

R. Sidney Boone, et al., Chapter 2: Kiln Types and Features; pp. 43-72—ananias.ubb.cl. Available at: http://ananias.ubb.cl/chapter02.pdf (Accessed: Oct. 4, 2021).

Lin, Biying, et al. "Improvement of radio frequency heating uniformity in wheat kernels with aluminum foil sheets covered on rectangular container walls." *Journal of Food Engineering* 314 (2022): 110768; pp. 1-11.

G. Tiwari, et al., Analysis of radio frequency (RF) power distribution in dry food materials, *Journal of Food Engineering* (2011), 104; pp. 548-556.

Ferrari-John, R. S., et al. "A tool for predicting heating uniformity in industrial radio frequency processing.", Available at: https://core.ac.uk/download/pdf/162661964.pdf (Accessed: Oct. 19, 2021).

Hao-Jie Chai et al., "Improvement Scheme and Verification of High-Frequency Heating Uniformity of Wood;" *Wood and Fiber Science*, 51(4), 2019; pp. 1-9. https://doi.org/10.22382/wfs-2019-xxx.

Robert Zwick et al., "Commercial RFV Kiln Drying-Recent Successes," *Western Dry Kiln Association* May 2000; pp. 36-44.

* cited by examiner

RADIOFREQUENCY HEATING OF WOOD USING A THREE-ELECTRODE SYSTEM HAVING A WINGED CENTRAL ELECTRODE

CROSS-REFERENCE TO RELATED APPLICATIONS

This application claims priority to U.S. provisional patent application No. 63/292,050 that was filed on Dec. 21, 2021, the entire contents of which are incorporated herein by reference.

STATEMENT OF GOVERNMENT INTEREST

This invention was made with government support under Grant No. 2020-51102-32919 and under Hatch Act Project No. PEN04716 awarded by the United States Department of Agriculture/NIFA. The Government has certain rights in the invention.

BACKGROUND

Radiofrequency (RF) heating of wood is an effective means for drying and phytosanitizing green timbers and logs. During RF heating, a wood pack is placed in an RF field and the RF energy is converted into heat via ionic conduction and dipole rotation. These mechanisms provide "volumetric heating" of the wood, in which heat is generated throughout the wood volume, rather than just at the surface. The use of RF heating is advantageous because radio waves are able to penetrate large volumes of wood with a low energy consumption to provide fast drying and phytosanitizing the wood. Unfortunately, obtaining a uniform internal temperature distribution during the RF heating of wood samples has proven challenging.

One approach to improving the temperature distribution for RF wood heating has been to use a five-electrode system in which two RF-driven plate electrodes are interleaved between two outer ground plate electrodes and a center ground plate electrode. These prior five-electrode set-ups could provide a higher degree of heating uniformity in a wood pack than an analogous three-electrode system having a central RF-driving electrode between two outer ground plate electrodes. However, the five-electrode design produces high thermal stress on the vacuum feedthroughs of the wood kiln due to their high operating power and still requires RF switches to even out the heating in the wood pack. Therefore, a more effective three-electrode set-up that overcomes the disadvantages of a five-electrode set-up for RF wood drying is needed.

SUMMARY

Wood kilns, electrode systems for wood kilns, and methods of using the systems for the RF heating of wood for the purpose of phytosanitizing and drying the wood are provided.

One example of a wood kiln includes: a vacuum chamber; a central plate electrode disposed within the vacuum chamber, the central plate electrode having a first planar pressing surface, a first angled flange flanking the first planar pressing surface, a second planar pressing surface disposed opposite the first planar pressing surface, and a second angled flange flanking the second planar pressing surface; a first ground plate electrode disposed within the vacuum chamber, wherein the first ground plate electrode is disposed on a first side of the central plate electrode; a second ground plate electrode disposed within the vacuum chamber, wherein the second ground plate electrode is disposed on a second side of the central plate electrode, opposite the first ground plate electrode, and a radiofrequency generator coupled to the central plate electrode. The central plate electrode, the first ground plate electrode, and the second ground plate electrode are arranged in parallel, and the first angled flange of the central plate electrode is angled toward the first ground plate electrode, and the second angled flange of the central plate electrode is angled toward the second ground plate electrode and away from the first angled flange.

One example of a method for heating wood using a radiofrequency heating apparatus of a type described herein includes the steps of: inserting at least one piece of wood between the first planar pressing surface of the central plate electrode and the first ground plate electrode and at least one piece of wood between the second planar pressing surface of the central plate electrode and the second ground plate electrode; and creating a radiofrequency electromagnetic field between the central plate electrode and the first ground plate electrode and between the central plate electrode and the second ground plate electrode, whereby the at least one piece of wood between the central plate electrode and the first ground plate electrode and the at least one piece of wood between the central plate electrode and the second ground plate electrode are heated by high frequency heating.

Other principal features and advantages of the invention will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the invention will hereafter be described with reference to the accompanying drawings, wherein like numerals denote like elements.

DETAILED DESCRIPTION

Wood kilns, electrode systems for wood kilns, and methods of using the systems for the RF heating of wood are provided. The systems are based on a parallel plate electrode design in which a central plate electrode having winged edges is disposed between a pair of ground plate electrodes.

The winged edges of the central plate electrode improve the uniformity of heating during RF drying and phytosanitizing processes, relative to the heating distribution provided by a five-electrode parallel plate RF drying system, or a three-electrode parallel plate RF drying system having a conventional planar central plate electrode.

Because the system requires only three electrodes, it reduces the thermal stress on the vacuum feedthroughs of the kiln and increases the impedance of the kiln per load, thereby decreasing the required power input and the losses in the vacuum feedthrough lines. As a result, the three-electrode design makes it possible to apply more power to a wider variety of wood specimens having a wider range of densities and moisture contents. The uniform heating provided by the three-electrode design also eliminates the need for high power RF switches on the feed lines, which are used to even out the heating of a wood pack using current wood kiln electrode designs. Relative to a five-electrode system, the three-electrode system is also easier to fill, since the wood pack can be divided into two stacks, rather than four.

As a result, the RF wood kilns are very effective at RF phytosanitary heating, a process in which RF heating is used to sterilize wood by killing living organisms in the wood. Such living organisms include a variety of pests, including insects, such as the emerald ash borer, bacteria, fungi, mites, viruses, and parasitic plants. Phytosanitary heating makes the wood safe for shipping out of infested areas. The present RF wood kilns are able to phytosanitize wood to the standards set by various standard setting organizations, such as the United States Department of Agriculture (USDA) and/or the International Plant Protection Convention's Commission on Phytosanitary Measures (e.g., International Standard for Phytosanitary Measures (ISPM) No. 15, Regulation of wood packaging material in international trade, as published on the filing date of this patent application).

Figure 1:
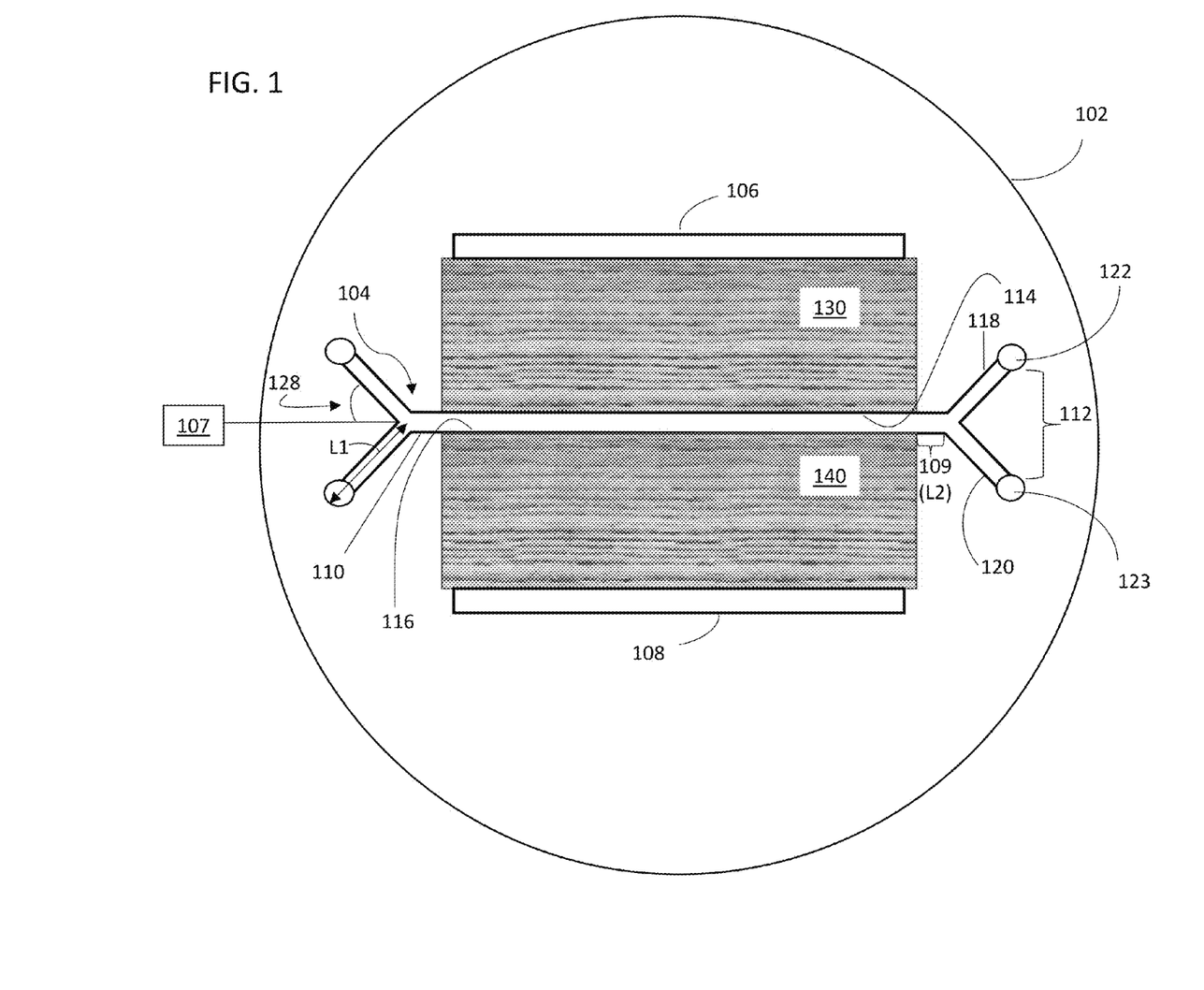
FIG. 1 is a schematic diagram showing a cross sectional view of a three-electrode system for the radiofrequency heating of wood, in which the central electrode is a radiofrequency driven, winged electrode.

FIG. 1 is a schematic diagram showing a cross-sectional view of a wood kiln that includes a winged central electrode. Wood heating will typically be carried out under vacuum (i.e., a pressure lower than atmospheric pressure) and, so, the embodiment of the system shown in FIG. 1 includes a vacuum chamber 102 sized to house a wood pack and the electrodes. Vacuum chamber 102 will include one or more ports for connections to a pressure control system composed of pressure gauges, pump lines, and/or controllers. The system includes three electrodes: a central plate electrode 104; a first ground plate electrode 106 disposed on a first side of central plate electrode 104; and a second ground plate electrode 108 disposed symmetrically on a second side of central plate electrode 106, such that central plate electrode 104 is disposed between first and second ground plate electrodes 106 and 108. The system further includes a radiofrequency generator 107 coupled to central plate electrode 104.

Central plate electrode 104 has a planar central section 110 and winged edges 112. Winged edges 112, which flank planar central section 110, include a first flange 118 that is angled away from the plane defined by planar central section 110 (e.g., upward in the orientation depicted in FIG. 1) and second flange 120 that is angled away from the plane defined by planar central section 110 and from first flange 118 (e.g., downward in the orientation depicted in FIG. 1). The distal ends of first flange 118 and second flange 120 may be rounded in order to avoid arcing during the RF drying process. Rounded ends may be provided, for example, by cylindrical tubes 122, 123 at the distal ends. It should be noted that, while ground plate electrodes 106, 108 and planar central section 110 are square in the embodiment shown in FIG. 1, other shapes can be used, such as rectangular or circular. Moreover, the flanges that form the wings may be present around the entire perimeter of planar central section 110, or only at one or more pairs of opposing lateral edges of planar central section 110; in either embodiment the flanges are said to "flank" the planar central section of the plate electrode.

Planar central section 110 has two, oppositely facing flat surfaces 114, 116, and first and second ground plate electrodes 106 and 108 also have flat surfaces 124 and 126. When the wood kiln is in operation, wood packs 130 and 140 comprising one or more pieces of wood are located between flat surfaces 114 and 116 of central plate electrode 104 and flat surfaces 124 and 126 of first and second ground plate electrodes 106 and 108. Planar central section 110 of central plate electrode 104 is desirably long enough to project beyond wood packs 130, 140 forming a projection 109 beyond wood packs 130, 140, while first and second ground plate electrodes 106, 108 are desirably, but not necessarily, shorter than central section 110, such that wood packs 130, 140 extend beyond first and second ground plate electrodes 106, 108.

The angles 128 formed between the plane defined by planar central section 110 and first and second wing flanges 118, 120, the length of said wing flanges, and the length of projection 109 are selected to improve the uniformity of the RF heating through the cross-sections of wood packs 130, 140, relative to an analogous RF heating system having the same components and configuration, with the exception that the central electrode in the analogous RF heating system lacks winged flanges 118, 120. The optimal angles 128, lengths of the flanges (L1), and length of the projection (L2), will depend on the distance between central plate electrode 104 and first and second plate electrodes 106, 108, which will depend on the dimensions of the wood pack filling the gaps between the electrodes. Generally, however, angles from 40° to 60° (including from 45° to 65°), flange lengths from 4 inches (in.) to 12 in. (including from 6 in. to 12 in.), and projection lengths from 0.5 in. to 5 in. (including from 1 in. to 3 in.) can be used. Sensors, such as fiber optic sensors, inserted at various locations along the longitudinal and transverse directions in the wood pack can be used to measure the improved heating uniformity provided by the present electrode design. The central and ground plate electrodes are constructed from an electrically conductive material, typically a metal such as aluminum or copper. The plate electrodes are generally quite thin and can be formed from thin sheets or foils. By way of illustration only, the plate electrodes can have thicknesses in the range from 0.03 in. to 0.14 in., including from 0.05 in. to 0.125 in.

During operation, radiofrequency generator 107 applies RF energy to central plate electrode 104 to generate electromagnetic fields between the central plate electrode 104 and first and second ground plate electrodes 106, 108. These electromagnetic fields penetrate wood pack 130, 140 generating thermal energy throughout the wood pack and drying the wood via volumetric heating. Without intending to be bound to any particular theory of the invention, it is proposed that the present electrode design results in more uniform heating because first and second flanges 118, 120 result in an electromagnetic field that is distributed more uniformly through the wood pack, particularly at edges and/or corners where the electric field density would otherwise be more concentrated.

Radiofrequency generator 107 is designed to generate radiofrequency waves at frequencies in the range from about 6 MHz up to about 100 MHz. The frequency and power density are selected to provide RF drying and/or phytosanitizing at a desired rate for the selected type of wood in the pack and the pack dimensions; generally, a higher power density will provide a higher drying and/or phytosanitizing rate. By way of illustration only, radiofrequencies in the range from 3 MHz to 50 MHz and/or applied powers in the range from 30 kW to 50 kW may be used. However, applied powers and frequencies outside of these ranges can be used. The radiofrequency generator may be, for example, a solid-state RF generator. The use of an RF generator is advantageous because RF generators allow for a high degree of control and can be operated at an exact fixed frequency (e.g., 6.78 MHz, 13.56 MHz, 27.12 MHz, or 40.68 MHz).

The RF heating systems described herein can be used to heat wood packs composed of a wide variety of woods, including both hardwoods and softwood, and further including raw wood and lumber. Examples of the types of wood that can be dried include pine, ash, and oak.

The wood packs can have a wide range of dimensions, including, but not limited to, wood packs composed of one or more stacked, and/or side-by-side wood pieces having a total pack height in the range from 1 meter (m) to 3 m. The lateral dimensions of the wood pack are not particularly limited. By way of illustration, wood packs with total pack lengths and pack widths in the range from 1 m to 10 m can be dried using the three-electrode systems described herein. However, wood packs with dimensions outside of these ranges can also be dried.

EXAMPLES

Figure 2:
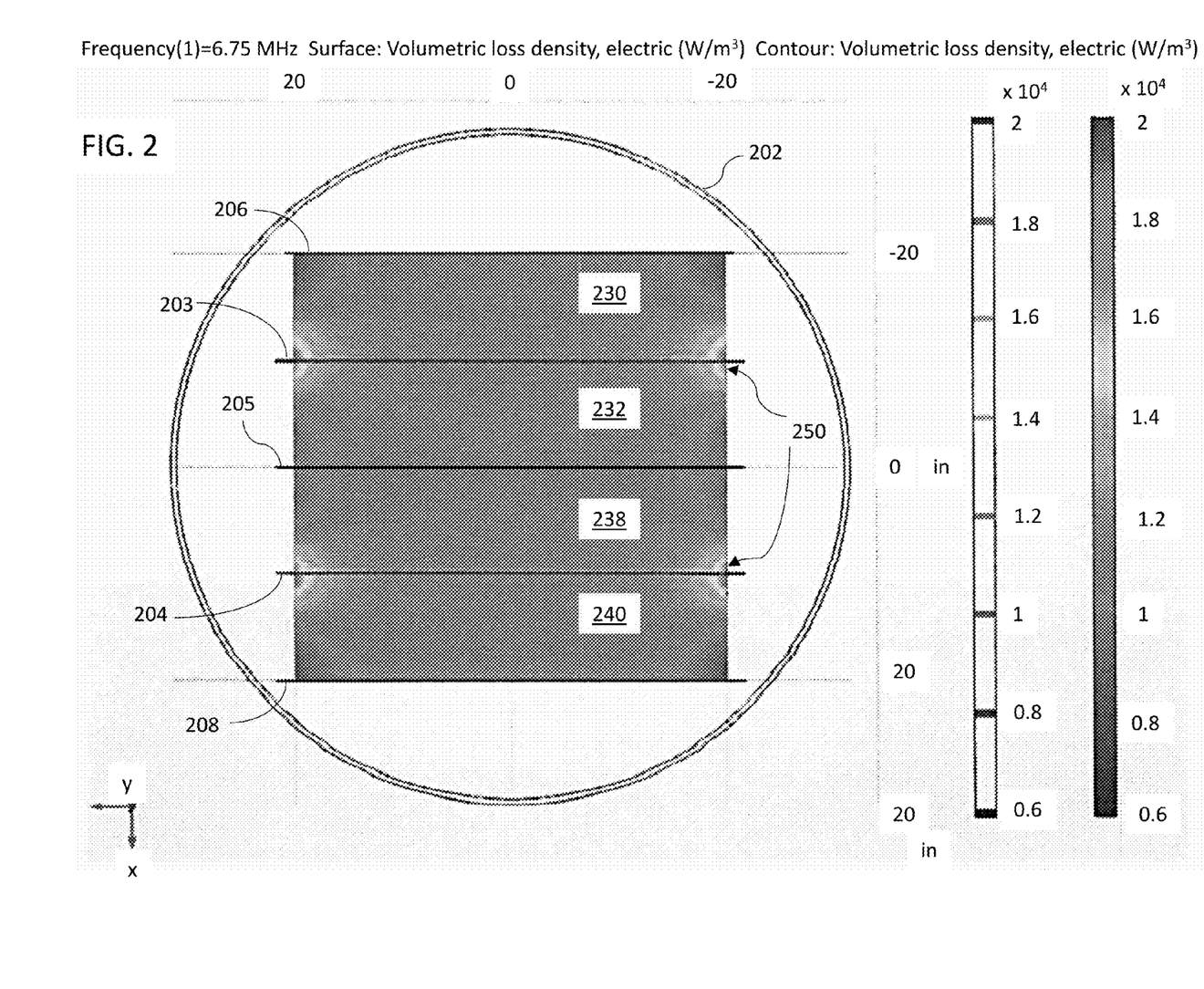
FIG. 2 shows a volumetric loss density plot for a simulation of a low relative permittivity wood pack dried using a five-electrode set-up (Example 1).

Example 1: (Comparative Example) Radiofrequency Heating and Drying of Wood Using Five-Electrode Configuration This example describes the radiofrequency heating of a wood pack 230, 232, 238, 240 based on a simulation using a three-dimensional (3D) electrostatic model in COMSOL. The wood kiln in the model had a 62" diameter vacuum chamber 202. The electrodes included two outer 206, 208 and one central 205 ground plate electrode interleaved with two intervening plate electrodes 203, 204 driven by a radiofrequency source. All of the electrodes were aluminum plate electrodes with lengths of ten feet and widths of 42 in. The wood pack had a relative permittivity (ER) of 3 and a dissipation factor (DF) of 20%. The spacing between the electrodes was 10". Electrodes 203 and 204 were driven with 2500 peak voltage (Vp) at a frequency of 6.78 MHz in the model. FIG. 2 shows the volumetric loss density in Wm$^{-3}$ within the wood pack. As shown in the figure, heating through the wood pack was non-uniform, with hot spots 250 developing at the sides of the wood pack in the regions close to RF driven plate electrodes 203 and 204 and extending inward into the wood pack along electrodes 203 and 204. The average volumetric loss density for the wood pack was 1.1125 kW/m$^3$, with a maximum volumetric loss density of 1.8836 kW/m$^3$.

Figure 3:
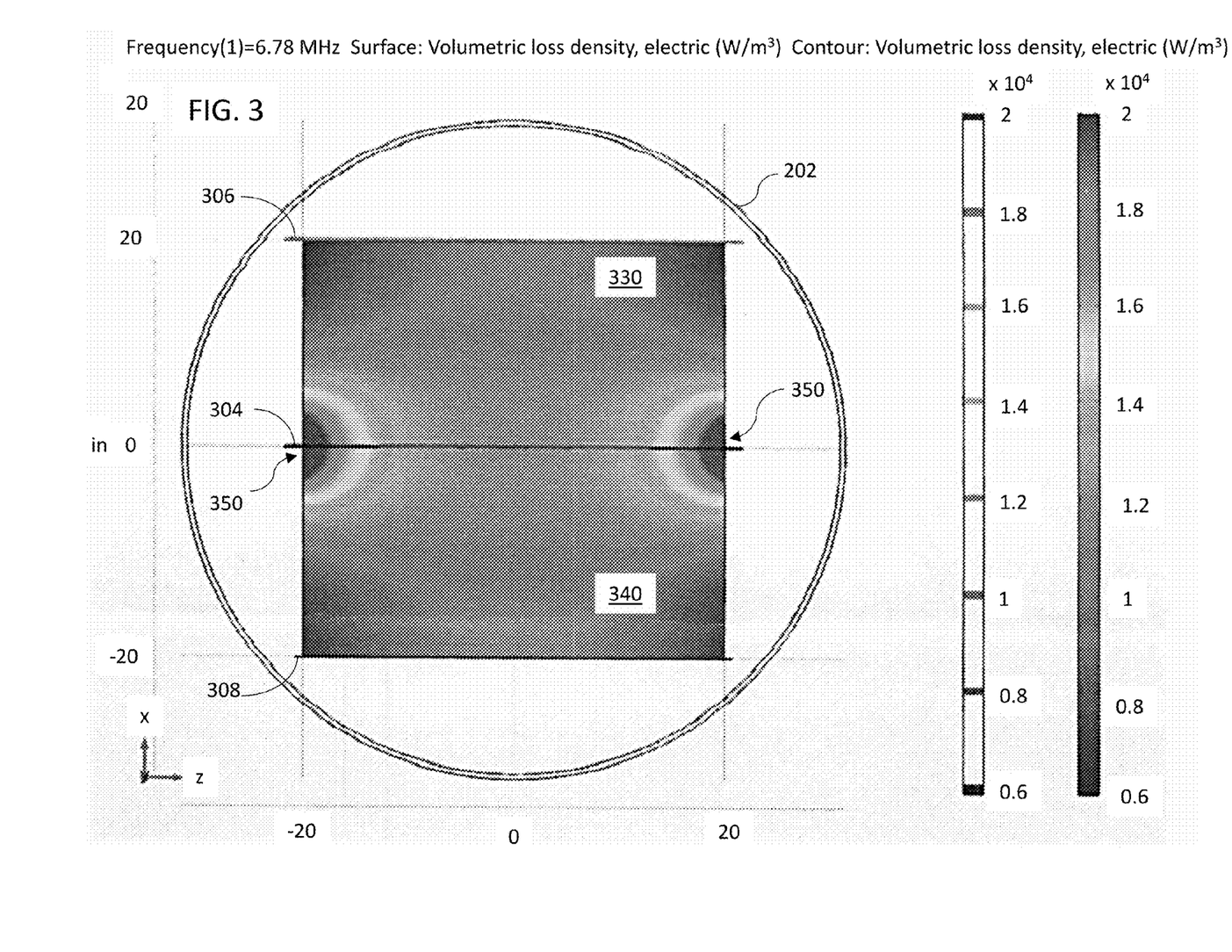
FIG. 3 shows a volumetric loss density plot for a simulation of a low relative permittivity wood pack dried using a three-electrode set-up in which the central electrode is a planar, non-winged electrode (Example 2).

Example 2: (Comparative Example) Radiofrequency Drying of Wood Using Three-Electrode Configuration, without a Winged Electrode This example describes the radiofrequency heating of a wood pack 330, 340 based on a simulation using the three-dimensional (3D) electrostatic model in COMSOL and a three-electrode configuration. As in Example 1, the wood pack had an ER of 3 and a DF of 20%. The electrodes included two outer ground plate electrodes 306, 308 and one central plate electrode 304 driven by a radiofrequency source. All of the electrodes were aluminum plate electrodes with lengths of ten feet and widths of 42 in. and a uniform spacing between the electrodes of 20". Central plate electrode 304, which lacked wings at the edges, was driven with 5000 Vp at a frequency of 6.78 MHz in the model. FIG. 3 shows the volumetric loss density in Wm$^{-3}$ within the wood pack. As shown in the figure, heating through the wood pack was non-uniform, with hot spots 350 developing at the sides of the wood pack in the regions close to RF driven plate electrode 304 and extending inward into the wood pack along electrode 304. The average volumetric loss density for the wood pack was 1.1219 kW/m$^3$, with a maximum volumetric loss density of 3.1846 kW/m$^3$.

Figure 4:
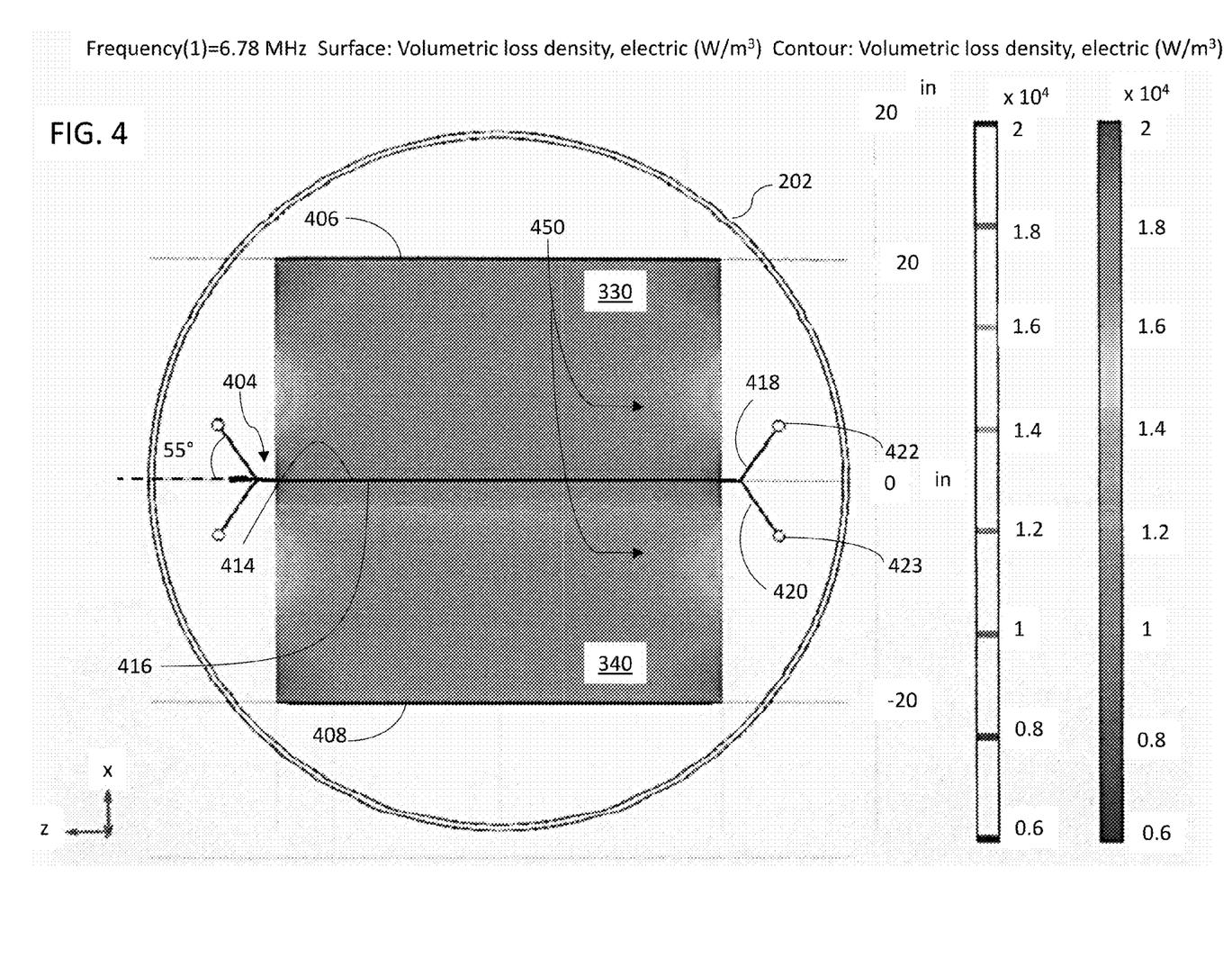
FIG. 4 shows a volumetric loss density plot for a simulation of a low relative permittivity wood pack dried using a three-electrode set-up in which the central electrode is a winged electrode (Example 3).

Example 3: (Illustrative Working Example) Radiofrequency Drying of Wood Using Three-Electrode Configuration, Including a Central Electrode with a Winged Edge This example describes the radiofrequency heating of the same wood pack of Example 2 based on a simulation using the 3D electrostatic model in COMSOL and a three-electrode configuration. The electrodes included two outer ground plate electrodes 406, 408 and a winged central plate electrode 404 driven by a radiofrequency source. All of the electrodes were aluminum plate electrodes with a uniform spacing between the electrodes of 20". In the simulations, outer ground plate electrodes 406, 408 were narrower than in Example 2, having lengths of 35 in., such that wood pack 330, 340 extended beyond the edges of the ground plates by 1 in. Winged central plate electrode 404 had a first flange 418 bent upward toward ground plate electrode 406 and a second flange 420 bent downward toward ground plate electrode 408. The angles formed between the plane of central plate 404 and first and second flanges 418, 420 were each 55°. The planar pressing surfaces 414 and 416 of central plate electrode 404 had a length of ten feet and a width of 33 in. Edge flanges 418 and 420 had lengths of 6.5 in., including a 1" diameter cylindrical aluminum tubes 422 and 423 at their distal ends. Central plate electrode 404 was driven with 5000 Vp at a frequency of 6.78 MHz in the model. FIG. 4 shows the volumetric loss density in Wm$^{-3}$ within the wood pack. As shown in the figure, the uniformity of the heating through the wood pack was improved relative to the uniformity of the heating in Example 1 and Example 2. There was some heating non-uniformity 450 at the sides of the wood pack between the ground plate electrodes 406, 408 and central RF driven plate electrode 404. However, this non-uniformity was significantly lower than that observed in the previous Examples. The average volumetric loss density for the wood pack was 1.1038 kW/m$^3$, with a maximum volumetric loss density of 1.4723 kW/m$^3$.

Figure 5:
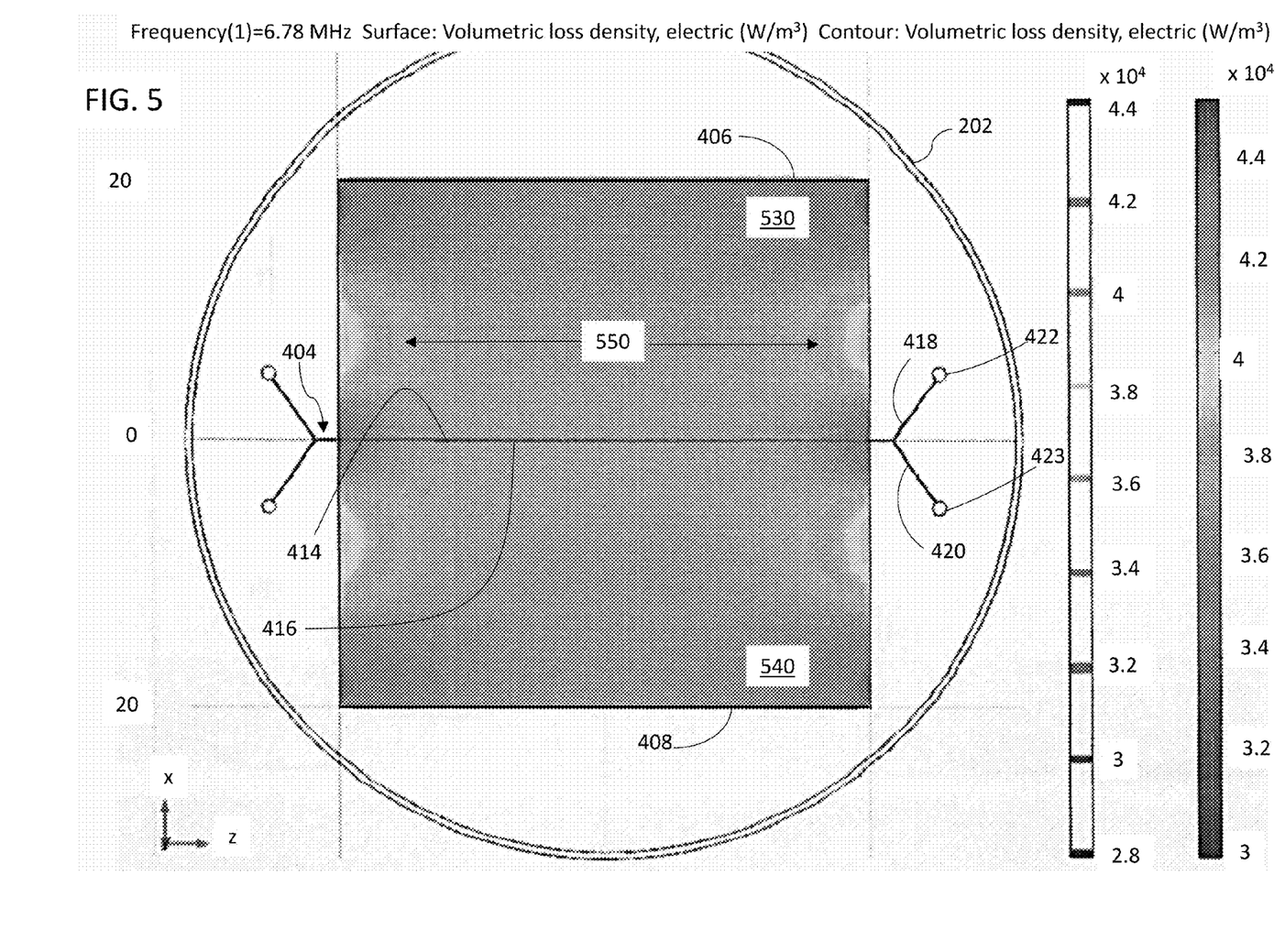
FIG. 5 shows a volumetric loss density plot for a simulation of a high relative permittivity wood pack dried using a three-electrode set-up in which the central electrode is a winged electrode (Example 4).

Example 4: (Illustrative Working Example) Radiofrequency Drying of Wood Using Three-Electrode Configuration, Including a Central Electrode with a Winged Edge, High Relative Permittivity Wood Pack This example describes the radiofrequency heating of a wood pack having a higher relative permittivity than the wood pack of Examples 1-3. The wood pack 530, 540 in this example had an ER of 3 and a DF of 20%. Here, again, the example is based on a simulation using the 3D electrostatic model in COMSOL and a three-electrode configuration. The electrodes and their spacing were the same as those used in Example 3. Central plate electrode 404 was driven with 5000 Vp at a frequency of 6.78 MHz in the model. FIG. 5 shows the volumetric loss density in $Wm^{-3}$ within the wood pack. As shown in the figure, even with the higher relative permittivity, the uniformity of the heating through the wood pack was improved relative to the uniformity of the heating in Example 1 and Example 2. As in Example 3, there was some heating non-uniformity 550 at the sides of the wood pack between the ground plate electrodes 406, 408 and central RF driven plate electrode 404. However, this non-uniformity was significantly lower than that observed in Examples 1 and 2. The average volumetric loss density for the wood pack was 3.6733 $kW/m^3$, with a maximum volumetric loss density of 4.1011 $kW/m^3$.

Conclusions: The wood kilns having a three-electrode design with a winged central electrode reduced the thermal stress on the feedthroughs by 75%. The impedance of the kiln was doubled for the wood load and, therefore, the current into the wood kiln was halved for the same power input. Since resistive losses in the feed network are proportional to current squared (P=I2R), the loss in the feedthrough/feed lines was also reduced by 75%. The three-electrode design with a winged central electrode and symmetric ground plate electrodes also effectively eliminated heating variations between the inner and outer zones of the wood pack.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A wood kiln comprising:
a vacuum chamber;
a central plate electrode disposed within the vacuum chamber, the central plate electrode having a first planar pressing surface, a first angled flange flanking the first planar pressing surface, a second planar pressing surface disposed opposite the first planar pressing surface, and a second angled flange flanking the second planar pressing surface;
a first ground plate electrode disposed within the vacuum chamber, wherein the first ground plate electrode is disposed on a first side of the central plate electrode;
a second ground plate electrode disposed within the vacuum chamber, wherein the second ground plate electrode is disposed on a second side of the central plate electrode, opposite the first ground plate electrode, wherein the central plate electrode, the first ground plate electrode, and the second ground plate electrode are arranged in parallel, and further wherein the first angled flange of the central plate electrode is angled toward the first ground plate electrode, and the second angled flange of the central plate electrode is angled toward the second ground plate electrode and away from the first angled flange; and
a radiofrequency generator coupled to the central plate electrode.

2. The wood kiln of claim 1, wherein the radiofrequency generator is a solid-state radiofrequency generator.

3. The wood kiln of claim 2, wherein the first angled flange has a rounded distal end and the second angled flange has a rounded distal end.

4. The wood kiln of claim 1, wherein the first angled flange has a rounded distal end and the second angled flange has a rounded distal end.

5. The wood kiln of claim 1, wherein angles defined between a plane defined by the first planar pressing surface and the first angled flange and between a plane defined by the second planar pressing surface and the second angled flange are in the range from 40° to 60°.

6. The wood kiln of claim 1, wherein the first angled flange and the second angled flange have lengths in the range from 4 inches to 12 inches.

7. The wood kiln of claim 1, wherein the central plate electrode, the first ground plate electrode, and the second ground plate electrode have thicknesses in the range from 0.03 inches to 0.14 inches.

8. A method for heating wood using a radiofrequency heating apparatus comprising:
a central plate electrode having a first planar pressing surface, a first angled flange flanking the first planar pressing surface, a second planar pressing surface disposed opposite the first planar pressing surface, and a second angled flange flanking the second planar pressing surface;
a first ground plate electrode disposed on a first side of the central plate electrode;
a second ground plate electrode disposed on a second side of the central plate electrode, opposite the first ground plate electrode, wherein the central plate electrode, the first ground plate electrode, and the second ground plate electrode are arranged in parallel, and further wherein the first angled flange of the central plate electrode is angled toward the first ground plate electrode, and the second angled flange of the central plate electrode is angled toward the second ground plate electrode and away from the first angled flange; and
a radiofrequency generator coupled to the central plate electrode,
the method comprising:
inserting at least one piece of wood between the first planar pressing surface of the central plate electrode and the first ground plate electrode and at least one piece of wood between the second planar pressing surface of the central plate electrode and the second ground plate electrode; and
creating a radiofrequency electromagnetic field between the central plate electrode and the first ground plate electrode and between the central plate electrode and the second ground plate electrode, whereby the at least one piece of wood between the central plate electrode and the first ground plate electrode and the at least one piece of wood between the central plate electrode and the second ground plate electrode are heated by high frequency heating.

9. The method of claim 8, wherein the radiofrequency generator is a solid-state radiofrequency generator.

10. The method of claim 8, wherein radiofrequencies of the radiofrequency electric field are in the range from 3 MHz to 50 MHz.

11. The method of claim 8, wherein the first angled flange has a rounded distal end and the second angled flange has a rounded distal end.

12. The method of claim 8, wherein angles defined between a plane defined by the first planar pressing surface and the first angled flange and between a plane defined by the second planar pressing surface and the second angled flange are in the range from 40° to 60°.

13. The method of claim 8, wherein the spacings between the central plate electrode and first and second ground plate electrodes, the lengths of the first and second flanges, and the angles of the first and second flanges are selected to improve the uniformity of the radiofrequency heating of the wood pieces, relative to the uniformity of the radiofrequency heating in the absence of the first and second flanges.

14. The method of claim 8, wherein multiple pieces of wood are inserted between the first planar pressing surface of the central plate electrode and the first ground plate electrode and between the second planar pressing surface of the central plate electrode and the second ground plate electrode.

* * * * *